May 12, 1931.  J. NOFFSINGER  1,804,509
AUTOMATIC COUPLER FOR AIR LINE HOSE OF RAILWAY CARS
Filed June 5, 1929    2 Sheets-Sheet 1
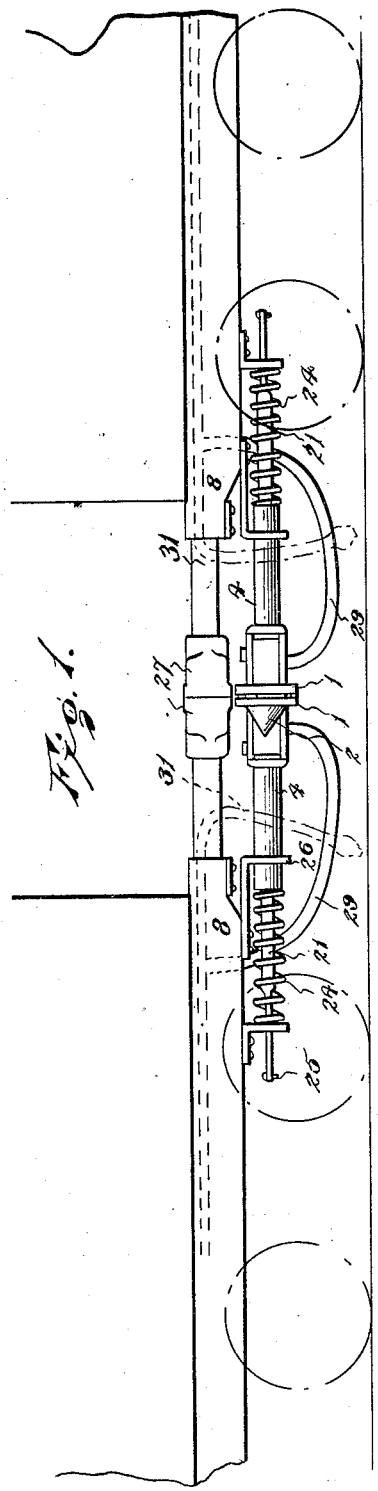
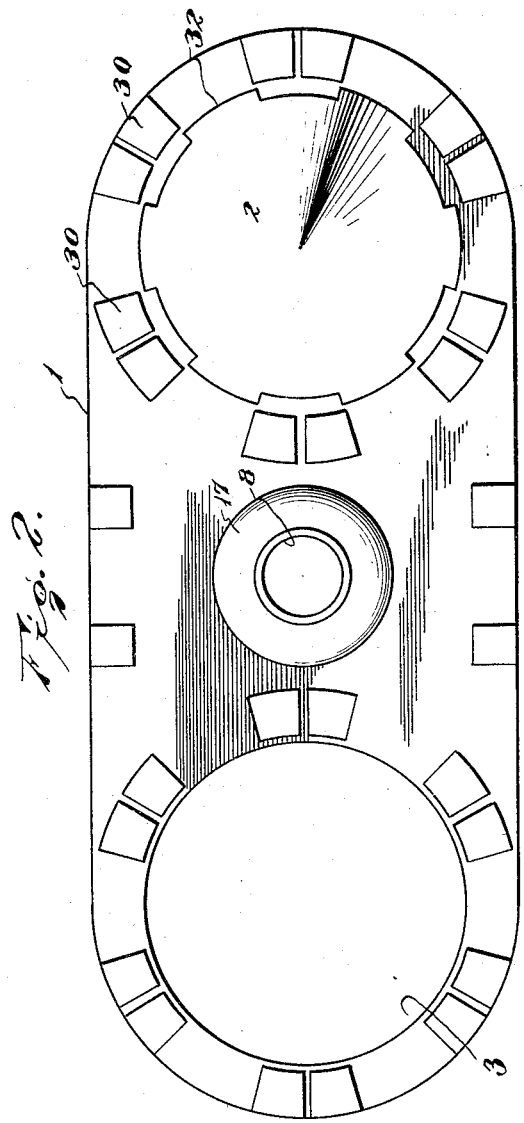
Inventor
J. Noffsinger
By Lacey & Lacey, Attorneys

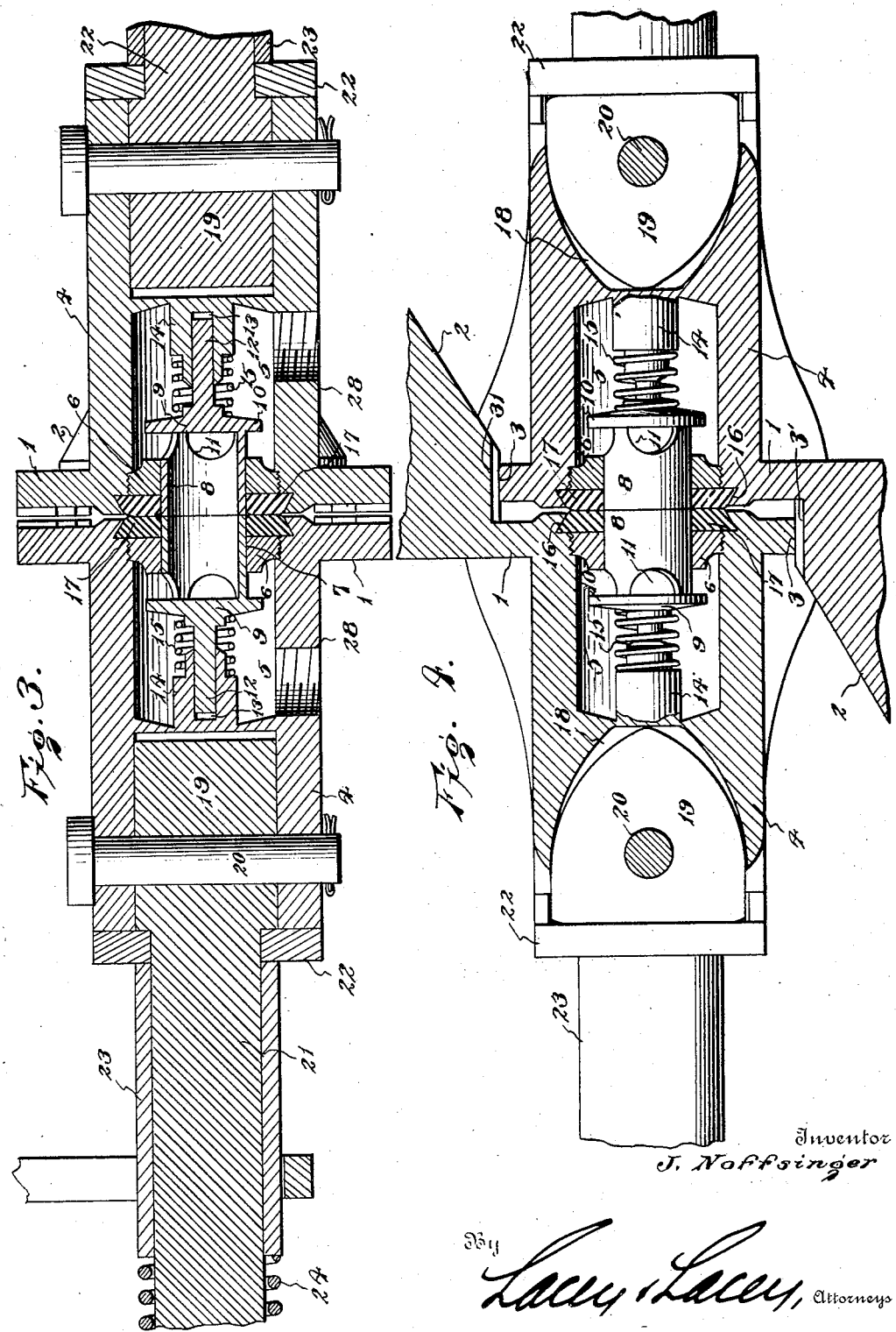

Patented May 12, 1931

1,804,509

UNITED STATES PATENT OFFICE

JOHN NOFFSINGER, OF JEWELL, OHIO

AUTOMATIC COUPLER FOR AIR LINE HOSE OF RAILWAY CARS

Application filed June 5, 1929. Serial No. 368,578.

The present invention is directed to improvements in couplers for air line hose of railway cars.

The primary object of the invention is to provide a device of this character so constructed that the operation of coupling and uncoupling the air hose will be entirely automatic.

Another object of the invention is to provide a device of this nature so constructed that when the cars are coupled the air controlling valves will remain open and will automatically close when the cars are uncoupled.

Another object of the invention is to provide a device of this kind so constructed that the coupling of the air hose will be effected automatically, thereby eliminating the necessity, and incident danger, of trainmen working between the cars.

With these and other objects in view, this invention resides in the novel features of construction, formation, combination and arrangement of parts to be hereinafter more fully described, claimed and illustrated in the accompanying drawings, in which:

Figure 1 is a side view.

Figure 2 is a front view of one of the head plates.

Figure 3 is a longitudinal sectional view through the coupler.

Figure 4 is a similar view, taken at right angles to Figure 1.

The coupler comprises a pair of head plates 1, and since the head plates and associated parts are identical in construction, the description of one will suffice for both.

Each of said plates is provided with an alining cone 2 and cone receiving opening 3, which are laterally spaced, said plates having formed integral therewith a stem 4 having a chamber 5 formed therein, the forward end of the chamber being closed by a threaded disc 6, said disc having a central opening 7. Slidable in the opening 7 is a valve sleeve 8 having its inner end closed by a head 9 provided with a marginal flange 10. This sleeve is provided with air passages 11. Extending rearwardly from the head 9 is a stem 12 which slidably engages a socket 13 formed axially in the boss 14, said boss being cast integral with the rear wall of the chamber 5. Encircling the stem 12 and interposed between the boss 14 and the head 9, is a coil spring 15 which tends to urge the valve stem outwardly. The plate 1 is provided with an angular undercut recess 16 in which is fitted a rubber gasket 17 of a thickness to permit its outer face to lie in a plane slightly beyond the plane of the outer face of the plate, the purpose of which will later appear.

The stem 4 has formed in its inner end, a recess 18 for receiving the tapered head 19, said head being pivotally retained in the recess by a pin 20. The head 19 has a shank 21 formed integral therewith, and fitted on said shank is a plate 22 which bears against the adjacent end of the head 19. Slidable on the shank 21 is a sleeve 23, the forward end of which bears against the plate 22, said sleeve having its outer end engaged by the adjacent end of the coil spring 24 which encircles the shank 21. The rear end of the spring abuts the bracket 25 carried by the sill of a car, there being a bracket 26 alined with said bracket 25 to aid in supporting the device. The brackets are so arranged that the plate 1 and its associated parts will be supported under the usual coupling heads 27. By pivotally mounting the head 19 the plate may swing slightly when a section of curved track is encountered.

The stem 4 has an opening 28 formed therein for connection of the air hose 29 so that air will enter the chamber 5.

The plate 1 has its outer face provided with a plurality of lugs 30, the purpose of which will appear later.

It will be observed that the alined cones and openings of the plates are arranged in alternating relationship, whereby the cone of one plate carried by one car will enter the opening of the companion plate carried by the other car.

When the plates 1 are in the position shown in Figures 3 and 4, the gaskets 17 are in firm contacting relation to prevent air leakage and owing to the resiliency of the gaskets, the adjacent ends of the sleeve valves 8 will be in contact. When in this position, the sleeves 8 are arranged in their innermost positions so that the air passages 11 will be uncovered by the discs 6, thus permitting air to freely pass from one chamber to the other throughout the system. At this time, the springs 15 will be under compression so that the ends of the sleeve valves 8 will be yieldably engaged. It will be obvious that when the cars are uncoupled and the plates 1 separate, the springs 15 will immediately expand and force the sleeve valves outwardly, whereupon the air passages 11 will be closed by the discs 6, thus cutting off the air supply. The sleeves 8 are limited in their outward movement by the flanges 10 contacting with the discs 6.

It will be apparent that when two cars are being coupled, the cones and openings of the respective plates cooperate to cause the sleeves 8 to be brought into direct alinement and when the plates are in full contact, the passages 11 of the sleeves will be fully opened for the passage of air.

In Figure 1, the usual air hose 31 is indicated in dotted lines so that should it be necessary to couple a car not equipped with the device to one equipped therewith, the old air hose can be used. It will, of course, be understood that after all cars have been equipped with the device and it is standard equipment, the old air hose can be eliminated.

The plate 1 can obviously be modified so that they can be applied to passenger cars in order that a steam pipe can be automatically connected.

The bases of the alining cones 2 are provided with cylindrical portions 3' which are adapted to enter the openings 3 when the device is fully coupled. Obviously, when these portions are engaged in the openings, relative swinging movement of the plates 1 is positively prevented as the cars swing, thus maintaining the sleeve valves 8 in direct alinement.

The cylindrical portions 3' are provided with ribs 32 and it will be obvious that the lugs 30 and ribs 32 will chip the ice from the plates and from the openings when the couplers are in their operative position.

From the foregoing, it is thought that the construction, operation, and many advantages of the herein described invention will be apparent to those skilled in the art, without further description, and it will be understood that various changes in size, shape, proportion and minor details of construction, may be resorted to without departing from the spirit or sacrificing any of the advantages of the invention.

What is claimed is:

A train line coupler comprising a plate having a centrally disposed valve mechanism, and having an opening at one side of the valve mechanism and a horn at the opposite side of the valve mechanism constituting a guide, the inner end of the guide being cylindrical and provided exteriorly with longitudinal ribs, a plurality of lugs being provided upon the outer face of the plate about the opening and guide and together with the ribs of the guide serving to remove ice when companion couplers are brought together and the guide of each plate engaged through the opening of the other plate.

In testimony whereof I affix my signature.

JOHN NOFFSINGER. [L. S.]